United States Patent
Zhang et al.

(10) Patent No.: US 11,258,569 B2
(45) Date of Patent: *Feb. 22, 2022

(54) METHOD AND APPARATUS FOR CONFIGURING CHANNEL QUALITY INDICATOR AND METHOD AND APPARATUS FOR CONFIGURING MODULATION AND CODING SCHEME

(71) Applicant: FUJITSU CONNECTED TECHNOLOGIES LIMITED, Kawasaki (JP)

(72) Inventors: Lei Zhang, Beijing (CN); Yi Wang, Beijing (CN); Yanling Lu, Beijing (CN); Hua Zhou, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,821

(22) Filed: Mar. 3, 2020

(65) Prior Publication Data

US 2020/0204331 A1 Jun. 25, 2020

Related U.S. Application Data

(63) Continuation of application No. 16/215,077, filed on Dec. 10, 2018, now Pat. No. 10,630,454, which is a
(Continued)

(51) Int. Cl.
*H04W 72/04* (2009.01)
*H04L 5/00* (2006.01)
*H04L 1/00* (2006.01)

(52) U.S. Cl.
CPC .......... *H04L 5/0057* (2013.01); *H04L 1/0016* (2013.01); *H04L 1/0026* (2013.01);
(Continued)

(58) Field of Classification Search
CPC ... H04L 5/0057; H04L 1/0027; H04L 1/0026; H04L 1/0028; H04L 1/0016; H04W 72/0413
See application file for complete search history.

(56) References Cited

U.S. PATENT DOCUMENTS

| 9,479,287 | B2 | 10/2016 | Yang et al. |
| 2006/0287743 | A1 | 12/2006 | Sampath et al. |

(Continued)

FOREIGN PATENT DOCUMENTS

| CN | 101438527 A | 5/2009 |
| CN | 101741508 A | 6/2010 |

(Continued)

OTHER PUBLICATIONS

Notice of Preliminary Rejection issued by the Korean Intellectual Property Office for corresponding Korean Patent Application No. 10-2015-7029553, mailed on Apr. 25, 2018, with English translation.

(Continued)

*Primary Examiner* — Fahmida S Chowdhury
(74) *Attorney, Agent, or Firm* — Myers Wolin, LLC

(57) ABSTRACT

A User Equipment (UE) including: a plurality of Channel Quality Indicator (CQI) index tables, at least one of which includes one or more CQI index corresponding to a modulation of higher order that is not supported by the other CQI index table; a receiver configured to receive CQI index table indication information from a base station, the CQI index table indication information indicating which CQI index table to use for CQI calculation; and a processor configured to calculate a CQI index by using the CQI index table indicated by the CQI index table indication information.

20 Claims, 4 Drawing Sheets

Related U.S. Application Data continuation of application No. 15/615,452, filed on Jun. 6, 2017, now Pat. No. 10,284,352, which is a continuation of application No. 14/861,557, filed on Sep. 22, 2015, now Pat. No. 10,097,330, which is a continuation of application No. PCT/CN2013/073040, filed on Mar. 22, 2013.

(52) U.S. Cl.
CPC .......... *H04L 1/0027* (2013.01); *H04L 1/0028* (2013.01); *H04W 72/0413* (2013.01)

(56) References Cited

U.S. PATENT DOCUMENTS

| | | |
|---|---|---|
| 2007/0259671 A1 | 11/2007 | Cheng et al. |
| 2009/0168718 A1 | 7/2009 | Wang et al. |
| 2009/0245408 A1 | 10/2009 | Mujtaba et al. |
| 2010/0150096 A1 | 6/2010 | Choi et al. |
| 2010/0195614 A1 | 8/2010 | Nimbalker et al. |
| 2012/0135778 A1 | 5/2012 | Tian et al. |
| 2012/0218968 A1 | 8/2012 | Kim et al. |
| 2012/0230290 A1* | 9/2012 | Seo ................ H04L 5/0057 370/329 |
| 2012/0314590 A1 | 12/2012 | Choudhury et al. |
| 2012/0327861 A1 | 12/2012 | Zhang et al. |
| 2013/0195008 A1* | 8/2013 | Pelletier ............ H04B 7/0417 370/328 |
| 2013/0265944 A1 | 10/2013 | Frenne et al. |
| 2014/0092785 A1* | 4/2014 | Song ................ H04L 1/0016 370/280 |
| 2015/0016553 A1 | 1/2015 | Yang et al. |
| 2015/0036590 A1* | 2/2015 | Lahetkangas ...... H04L 1/0009 370/328 |
| 2015/0071238 A1 | 3/2015 | Seo et al. |
| 2015/0289213 A1 | 10/2015 | Futagi et al. |
| 2015/0358111 A1* | 12/2015 | Marinier ............ H04L 1/0026 370/329 |
| 2015/0372784 A1 | 12/2015 | Xu et al. |
| 2016/0173256 A1 | 6/2016 | Seo et al. |
| 2017/0310443 A1 | 10/2017 | Seo et al. |
| 2017/0366298 A1 | 12/2017 | Xu et al. |

FOREIGN PATENT DOCUMENTS

| | | |
|---|---|---|
| CN | 102687438 A | 9/2012 |
| CN | 103297181 A | 9/2013 |
| EP | 1 845 742 A1 | 10/2007 |
| EP | 2 066 058 A2 | 6/2009 |
| EP | 2879427 A1 | 6/2015 |
| JP | 2006-238314 A | 9/2006 |
| JP | 2015-512213 A | 4/2015 |
| KR | 10-2009-0111250 A | 10/2009 |
| KR | 10-2015-0097777 A | 8/2015 |
| RU | 2 462 826 C1 | 9/2012 |
| TW | 200931864 A | 7/2009 |
| WO | 2010/018442 A2 | 2/2010 |
| WO | 2012/043346 A2 | 4/2012 |
| WO | 2012/165820 A2 | 12/2012 |
| WO | 2013/127303 A1 | 9/2013 |
| WO | 2014/051697 A1 | 4/2014 |

OTHER PUBLICATIONS

Hitachi Ltd, "Views on 256QAM for small cell enhancement", Agenda Item: 7.3.5.2, 3GPP TSG-RAN WG1 Meeting #72, R1-130341, Malta, Jan. 28-Feb. 1, 2013.
Catt et al., "Correction on UE-specific RS overhead for deriving CQI when PMI/RI is configured in TM9", 3GPP TSG RAN WG1 Meeting #72, R1-130698, St. Julian's, Malta, Jan. 28-Feb. 1, 2013.
Non-Final Office Action issued by the United States Patent and Trademark Office for corresponding U.S. Appl. No. 14/861,557, electronically delivered on Feb. 5, 2018.
First Notification of Office Action issued by the State Intellectual Property Office of China for corresponding Chinese Patent Application No. 201380074705.1, dated May 31, 2018, with an English translation.
Non-Final Office Action issued by the United States Patent and Trademark Office for corresponding U.S. Appl. No. 15/615,452, electronically delivered on Aug. 27, 2018.
Office Action issued by the Canadian Intellectual Property Office for corresponding Canadian Patent Application No. 2,907,153, dated Mar. 29, 2018.
Office Action issued by the Canadian Intellectual Property Office for corresponding Canadian Patent Application No. 2,907,153, dated Jun. 5, 2017.
Notice of Final Rejection issued by the Korean Intellectual Property Office for corresponding Korean Patent Application No. 10-2015-7029553, dated Jul. 31, 2017, with English translation.
Notice of Preliminary Rejection issued by the Korean Intellectual Property Office for corresponding Korean Patent Application No. 10-2015-7029553, dated Sep. 27, 2017, with English translation.
Communication of the substantive examination report issued by the Mexican Institute of Industrial Property for corresponding Mexican Patent Application No. MX/A/2015/013469, dated Oct. 5, 2017, with an English translation.
Non-Final Office Action issued by the United States Patent and Trademark Office for corresponding U.S. Appl. No. 14/861,557, dated Aug. 24, 2017.
International Search Report issued for corresponding International Patent Application No. PCT/CN2013/073040, dated Jan. 9, 2014, with an English translation.
ETSI TS 136 213 V11.2.0, "LTE; Evolved Universal Terrestrial Radio Access (E-UTRA); Physical layer procedures (3GPP TS 36.213 version 11.2.0 Release 11)", Apr. 2013.
International Preliminary Report on Patentability with Written Opinion of the International Searching Authority for corresponding International Patent Application No. PCT/CN2013/073040 dated Sep. 22, 2015, with English translation.
First Office Action issued for corresponding Japanese Patent Application No. 2016-503510, dated Oct. 18, 2016, with an English translation.
Partial Supplementary European Search Report issued by the European Patent Office for corresponding European Patent Application No. 13878889.8 dated Oct. 13, 2016.
Notice of Preliminary Rejection issued for corresponding Korean Patent Application No. 10-2015-7029553, dated Nov. 30, 2016, with an English translation.
Notification regarding unity of invention requirement violation issued by Rospatent Federal Service for Intellectual Property for corresponding Russian Patent Application No. 2015145101/08(069424), mailed on Dec. 28, 2016, with an English translation.
Search report issued by Rospatent Federal Service for Intellectual Property for corresponding Russian Patent Application No. 2015145101/08(069424), dated Dec. 27, 2016, with an English translation A.
Extended European search report with supplementary European search report and the European search opinion issued by the European Patent Office for corresponding European Patent Application No. 13878889.8, dated Feb. 17, 2017.
Communication of the substantive examination report issued by the Mexican Institute of Industrial Property for corresponding Mexican Patent Application No. MX/a/2015/013469, dated Feb. 23, 2017, with an English translation.
Office Action issued by Rospatent Federal Service for Intellectual Property for corresponding Russian Patent Application No. 2015145101/08(069424), dated Apr. 25, 2017, with an English translation.
Non-Final Office Action issued by the United States Patent and Trademark Office for corresponding Appl. No. 14/861,557, electronically delivered on Mar. 10, 2017.
2nd Notification of Office Action and Search Report issued for corresponding Chinese Application No. 201380074705.1, dated Jul. 3, 2019, with full English translation.
Communication pursuant to Article 94(3) EPC issued for corresponding European Application No. 13878889.8, dated Sep. 27, 2019.

(56) References Cited

OTHER PUBLICATIONS

Non-Final Office Action issued by the United States Patent and Trademark Office for corresponding U.S. Appl. No. 16/215,077, electronically delivered on Sep. 19, 2019.

Notice of Allowance issued by the United States Patent and Trademark Office for corresponding U.S. Appl. No. 16/215,077, electronically delivered on Jan. 23, 2020.

First Notification of Office Action and Search Report issued by the China National Intellectual Property Administration for corresponding Chinese Patent Application No. 201910346272.X, dated May 26, 2021, with an English translation.

ZTE, "Consideration on high order modulation for small cell", Agenda Item: 7.3.5.2, 3GPP TSG-RAN WG1 Meeting #72, R1-130136, St Julian's, Malta, Jan. 28-Feb. 1, 2013.

First Notification of Office Action and Search Report issued by the China National Intellectual Property Administration for corresponding Chinese Patent Application No. 201910880503.5, dated Jun. 4, 2021, with an English translation.

Communication pursuant to Article 94(3) EPC issued by the European Patent Office for corresponding European Patent Application No. 13 878 889.8-1216, dated Jun. 28, 2021.

Communication pursuant to Article 94(3) EPC issued by the European Patent Office for corresponding European Patent Application No. 13 878 889.8-1220, dated Nov. 2, 2020.

Second Notification of Office Action and the Search Report issued by China National Intellectual Property Administration for corresponding Chinese Patent Application No. 201910346272.X and dated Nov. 29, 2021, with English translation.

Second Notification of Office Action and the Search Report issued by China National Intellectual Property Administration for corresponding Chinese Patent Application No. 201910880503.5 and dated Nov. 30, 2021, with English translation.

* cited by examiner

101 configuring UE with a CQI index table by an eNB via CQI index table
indication information, so that the UE determines the configured CQI
index table according to the indication information, and calculates a
CQI index according to calculated PMI and RI by using the configured
CQI index table

FIG. 1

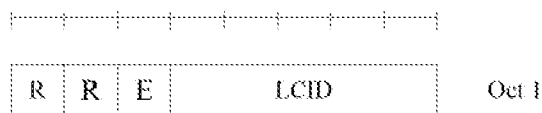

FIG. 2

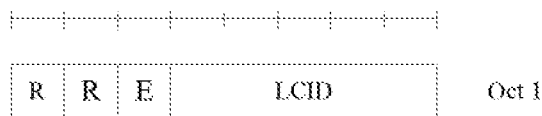

FIG. 3

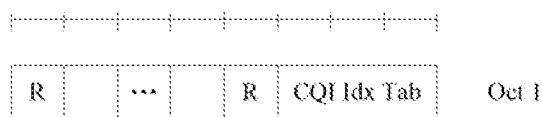

FIG. 4

501 calculating PMI and RI by UE according to an estimated result of channel

502 determining a configured CQI index table by the UE according to received
CQI index table indication information transmitted by an eNB

503 calculating a CQI index by the UE according to the PMI and the RI by
using the configured CQI index table

FIG. 5

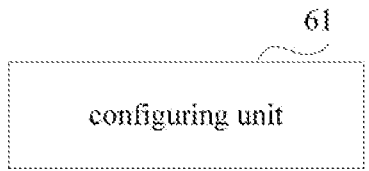
FIG. 6
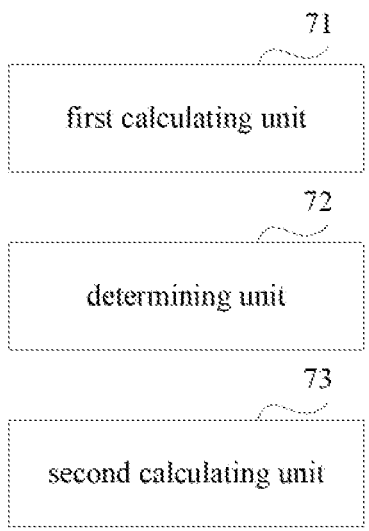
FIG. 7
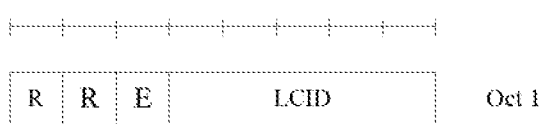
FIG. 8
FIG. 9

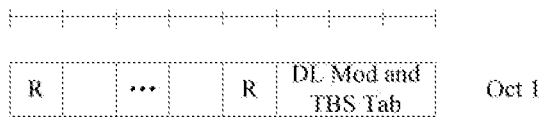

FIG. 10

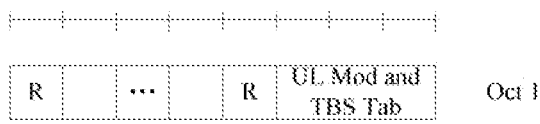

FIG. 11

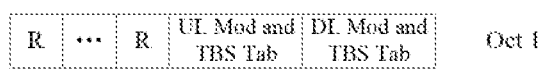

FIG. 12

```
                                                    1301
┌─────────────────────────────────────────────────────────────┐
│  determining a modulation and TBS index table used for       │
│  downlink transmission by UE according to received           │
│  modulation and TBS index table indication information       │
│  transmitted by an eNB                                       │
└─────────────────────────────────────────────────────────────┘
                            │              1302
                            ▼
┌─────────────────────────────────────────────────────────────┐
│  determining, by the UE according to the modulation and TBS  │
│  index table used for downlink transmission, the MCS         │
│  configured by the eNB for it                                │
└─────────────────────────────────────────────────────────────┘
```

FIG. 13

```
                                                    1401
┌─────────────────────────────────────────────────────────────┐
│  determining a modulation and TBS index table needed in      │
│  uplink transmission by UE according to received modulation  │
│  and TBS index table indication information transmitted by   │
│  an eNB                                                      │
└─────────────────────────────────────────────────────────────┘
                            │              1402
                            ▼
┌─────────────────────────────────────────────────────────────┐
│  determining, by the UE according to the modulation and TBS  │
│  index table needed in uplink transmission, the MCS          │
│  configured by the eNB for it                                │
└─────────────────────────────────────────────────────────────┘
```

FIG. 14

METHOD AND APPARATUS FOR CONFIGURING CHANNEL QUALITY INDICATOR AND METHOD AND APPARATUS FOR CONFIGURING MODULATION AND CODING SCHEME

CROSS REFERENCE TO RELATED APPLICATIONS

This application is a continuation of U.S. application Ser. No. 16/215,077 filed Dec. 10, 2018, now pending, which is a continuation application U.S. application Ser. No. 15/615,452, which was filed on Jun. 6, 2017, now U.S. patent Ser. No. 10/284,352 issued May 7, 2019, which is a continuation application of U.S. application Ser. No. 14/861,557, filed Sep. 22, 2015, now U.S. patent Ser. No. 10/097,330 issued Oct. 9, 2018, which is a continuation of International Application PCT/CN2013/073040 filed on Mar. 22, 2013, the entire contents of each are incorporated herein by reference.

TECHNICAL FIELD

The present disclosure relates to the field of communications, and in particular to a method for configuring channel quality indicator (CQI) and a method and apparatus for configuring modulation and coding scheme.

BACKGROUND ART

Small cell is one of the hottest topics in long-term evolution advanced (LTE-A) Release 12.

Currently, the most of operating cost of mobile communication operators is the energy charge which is expended by base stations. Some researches show that energy can be effectively saved by replacing a macro cell with small cells on the premise of the same covering area, because base stations of the small cells are of small power, produce less heat, and may need fewer or may not need cooling devices. Besides, the size of small cell base stations is much smaller than that of macro cells. Small cells are of low cost and are easy to be deployed.

In some cases, such as in an indoor environment, a channel from a base station of the small cells to user equipment (UE) contains a line-of-sight, which is less subjected to interference in transmission, and a signal to noise ratio in transmission is relatively high. A good signal propagation environment can ensure correct transmission of modulation symbols of higher orders, thereby efficiently improving spectrum efficiency. Hence, LTE of next release will support a constellation modulation scheme of a higher order, such as 256 QAM modulation.

In order to better support adaptive coding modulation transmission, LTE supports flexible code rate and modulation scheme. First of all, UE calculates corresponding PMI (precoding matrix indicator) and RI (rank indication) information based on an estimation result of channels, and selects suitable CQI (Channel quality indicator) indices for a wide band or a subband according to its own abilities of reception and demodulation, and then feeds the above information back to the base station in an agreed manner in LTE. LTE supports 16 CQI indices are supported as shown in Table 1 (which is Table 7.2.3-1 in 3GPP TS 36.213). Besides that CQI index 0 is used to denote "out of range", other 15 CQI indices correspond respectively to a coding and modulation scheme, that is, a modulation scheme and a code rate of channel coding. The UE uses uplink transmission to feed back the CQI indices obtained through calculation to the eNB. The CQI index of the wide band uses that an absolute transmission scheme is carried by 4-bit information. CQI information (containing a PMI, RI and a CQI index) may be carried and transmitted by a physical uplink control channel (PUCCH) or a physical uplink shared channel (PUSCH).

TABLE 1

4-bit CQI table

| CQI index | Modulation | Code rate × 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

After obtaining the CQI information fed back by the UE, the base station schedules and configures the UE based on a realtime scheduling and load situation and the information fed back by the UE. The base station will indicate time and frequency resources where downlink data transmitted to the UE are located and a coding and modulation scheme employed in transmission to the UE via a physical downlink control channel (PDCCH). Or the eNB indicates the UE via a PDCCH which time and frequency resource and which coding and modulation scheme should be employed for uplink data transmission. The coding and modulation scheme is indicated via 5-bit information ($I_{MCS}$) here. Except PDCCH format 3A (which is specifically used for power control indication of an uplink control channel), all other PDCCH formats contain one or two pieces of $I_{MCS}$ information. The number of pieces of $I_{MCS}$ information is related to the number of transport blocks (TBs) in transmission, and there is at least one TB and at most two TBs in one time of transmission.

After having received the $I_{MCS}$ information, the UE looks up tables to get a an $I_{TBS}$ index and a modulation scheme. If the received $I_{MCS}$ is used for downlink transmission demodulation decoding, Table 2 (which is Table 7.1.7.1-1 in 3GPP specification TS 36.213) is looked up. If the received $I_{MCS}$ is used for uplink transmission coding modulation, Table 3 (which is Table 8.6.1-1 in 3GPP specification TS 36.213) is looked up.

TABLE 2

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |

TABLE 2-continued

Modulation and TBS index table for PDSCH

| MCS Index $I_{MCS}$ | Modulation Order $Q_m$ | TBS Index $I_{TBS}$ |
|---|---|---|
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 3

Modulation, TBS index and redundancy version table for PUSCH

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Thereafter, the UE may obtain a size of an information bit of a TB (resource block) according to the $I_{TBS}$ and the size of the transmission resource (the number of resource blocks (RBs)) by looking up the TBS (transport block size) table, so as to indirectly obtain the code rate. As an example, Table 4 only gives a TBS table to which 1-10 RBs correspond (from Table 7.1.7.2.1 in 3GPP specification TS 36.213); where, $N_{PRB}$ is the number of the RBs.

TABLE 4

TBS table (size: 27 × 110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |

TABLE 4-continued

TBS table (size: 27 × 110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

It can be seen from the above description that the CQI index and the $I_{MCS}$ are very important indication information in uplink and downlink transmission of an LTE system. The CQI index is carried by 4-bit information, and may indicate at most sixteen cases currently, each case having a corresponding coding and modulation scheme. And the $I_{MCS}$ is carried by 5-bit information, and may indicate at most thirty-two cases currently, whatever uplink or downlink, each case having a corresponding coding and modulation scheme. If a new modulation scheme, such as 256 QAM, is added, 1 bit must be added to both the CQI index and the $I_{MCS}$; otherwise, following a current manner cannot indicate a coding and modulation scheme that is modulated by using 256 QAM.

However, in the implementation of the present disclosure, the inventors found that in an existing transmission manner, if 1 bit is added to both CQI index and $I_{MCS}$, about 10% of the load will be increased in each time of transmission. This may possibly lower transmission reliabilities of related uplink and downlink control information. For example, in a case that physical transmission resources are unchanged, addition of uncoded information will reduce coding check redundancy bits, thereby lowering protection force of coding for the information.

It should be noted that the above description of the background art is merely provided for clear and complete explanation of the present disclosure and for easy understanding by those skilled in the art. And it should not be understood that the above technical solution is known to those skilled in the art as it is described in the background art of the present disclosure.

SUMMARY OF THE DISCLOSURE

An object of the embodiments of the present disclosure is to provide a method and apparatus for configuring channel quality indicator (CQI) and a method and apparatus for configuring modulation and coding scheme, so that when a new modulation scheme is added, normal configuration of an LTE system may be ensured without increasing the number of bits of the CQI index and $I_{MCS}$.

According to a first aspect of the embodiments of the present disclosure, there is provided a method for configuring channel quality indicator (CQI), including:

configuring UE with a CQI index table by an eNB via CQI index table indication information, so that the UE determines the configured CQI index table according to the indication information, and calculates a CQI index according to calculated precoding matrix indicator (PMI) and rank indication (RI) by using the configured CQI index table.

According to a second aspect of the embodiments of the present disclosure, there is provided a method for configuring channel quality indicator (CQI), including:

calculating PMI and RI by UE according to a channel estimated result;

determining a configured CQI index table by the UE according to received CQI index table indication information transmitted by an eNB; and calculating a CQI index by the UE according to the PMI and the RI by using the configured CQI index table.

According to a third aspect of the embodiments of the present disclosure, there is provided a method for configuring modulation and coding scheme (MCS), including:

configuring UE by an eNB with a modulation and transport block size (TBS) index table used for downlink transmission, and/or a modulation and TBS index table needed in uplink transmission, via modulation and TBS index table indication information, so that the UE, after receiving the indication information, determines the MCS configured by the eNB for it according to the modulation and TBS index table used for downlink transmission and/or the modulation and TBS index table needed in uplink transmission.

According to a fourth aspect of the embodiments of the present disclosure, there is provided a method for configuring modulation and coding scheme (MCS), including:

determining a modulation and TBS index table used for downlink transmission by UE according to received modulation and TBS index table indication information transmitted by an eNB; and determining, by the UE according to the modulation and TBS index table used for downlink transmission, the MCS configured by the eNB for it.

According to a fifth aspect of the embodiments of the present disclosure, there is provided a method for configuring modulation and coding scheme (MCS), including:

determining a modulation and TBS index table needed in uplink transmission by UE according to received modulation and TBS index table indication information transmitted by a base station; and determining, by the UE according to the modulation and TBS index table needed in uplink transmission, the MCS configured by the eNB for it.

According to a sixth aspect of the embodiments of the present disclosure, there is provided an eNB, applicable to configuring UE with CQI, including:

a configuring unit configured to configure UE with a CQI index table via CQI index table indication information, so that the UE determines the configured CQI index table according to the indication information, and calculates a CQI index according to calculated precoding matrix indicator (PMI) and rank indication (RI) by using the configured CQI index table.

According to a seventh aspect of the embodiments of the present disclosure, there is provided UE, including:

a first calculating unit configured to calculate PMI and RI according to a channel estimated result;

a determining unit configured to determine a configured CQI index table according to received CQI index table indication information transmitted by an eNB; and a second calculating unit configured to calculate a CQI index according to the PMI and the RI by using the CQI index table configured by the eNB for the UE determined by the determining unit.

According to an eighth aspect of the embodiments of the present disclosure, there is provided an eNB, applicable to configuring UE with an MCS, including:

a configuring unit configured to configure UE with a modulation and TBS index table used for downlink transmission, and/or a modulation and TBS index table needed in uplink transmission, via modulation and TBS index table indication information, so that the UE, after receiving the indication information, determines the MCS configured by the eNB for it according to the modulation and TBS index table used for downlink transmission and/or the modulation and TBS index table needed in uplink transmission.

According to a ninth aspect of the embodiments of the present disclosure, there is provided UE, including:

a first determining unit configured to determine a modulation and TBS index table used for downlink transmission according to received modulation and TBS index table indication information transmitted by an eNB; and a second determining unit configured to determine the MCS configured by the eNB for it according to the modulation and TBS index table used for downlink transmission.

According to a tenth aspect of the embodiments of the present disclosure, there is provided UE, including:

a first determining unit configured to determine a modulation and TBS index table needed in uplink transmission according to received modulation and TBS index table indication information transmitted by an eNB; and a second determining unit configured to determine the MCS configured by the eNB for it according to the modulation and TBS index table needed in uplink transmission.

According to another aspect of the embodiments of the present disclosure, there is provided a communication system, including the UE as described in the seventh aspect and the eNB as described in the sixth aspect, or including the UE as described in the ninth aspect and the eNB as described in the eighth aspect, or including the UE as described in the tenth aspect and the eNB as described in the eighth aspect.

According to a further aspect of the embodiments of the present disclosure, there is provided a computer-readable program, wherein when the program is executed in an eNB, the program enables a computer to carry out the method for configuring channel quality indicator (CQI) as described in the first aspect, or the method for configuring modulation and coding scheme (MCS) as described in the third aspect, in the eNB.

According to still another aspect of the embodiments of the present disclosure, there is provided a storage medium in which a computer-readable program is stored, wherein the computer-readable program enables a computer to carry out the method for configuring channel quality indicator (CQI) as described in the first aspect, or the method for configuring modulation and coding scheme (MCS) as described in the third aspect, in an eNB.

According to still another aspect of the embodiments of the present disclosure, there is provided a computer-readable program, wherein when the program is executed in terminal equipment, the program enables a computer to carry out the method for configuring channel quality indicator (CQI) as described in the second aspect, or the method for configuring modulation and coding scheme (MCS) as described in the fourth or the fifth aspect, in the terminal equipment.

According to still another aspect of the embodiments of the present disclosure, there is provided a storage medium in which a computer-readable program is stored, wherein the computer-readable program enables a computer to carry out the method for configuring channel quality indicator (CQI) as described in the second aspect, or the method for configuring modulation and coding scheme (MCS) as described in the fourth or the fifth aspect, in terminal equipment.

An advantage of the embodiments of the present disclosure exists in that with the embodiments of the present disclosure, the eNB may configure different UEs with different '4-bit CQI tables' and/or 'modulation and TBS index tables' while keeping the CQI index and the $I_{MCS}$ bit number unchanged. Therefore, not only the CQI index and the $I_{MCS}$ bit number need not to be increased, but also normal configuration of the LTE system may be ensured.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced in size. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment. In the drawings:

FIG. 1 is a flowchart of the method for configuring channel quality indicator (CQI) of Embodiment 1 of the present disclosure;

FIG. 2 is a schematic diagram of MAC signaling having only head information;

FIG. 3 is a schematic diagram of a structure of head information of MAC signaling having head information and content information;

FIG. 4 is a schematic diagram of a structure of content information of MAC signaling having head information and content information;

FIG. 5 is a flowchart of the method for configuring channel quality indicator (CQI) of Embodiment 2 of the present disclosure;

FIG. 6 is a schematic diagram of a structure of an eNB corresponding to the method of FIG. 1;

FIG. 7 is a schematic diagram of a structure of UE corresponding to the method of FIG. 5;

FIG. 8 is a flowchart of the method for configuring modulation and coding scheme (MCS) of Embodiment 5 of the present disclosure;

FIG. 9 is a schematic diagram of a structure of head information of MAC signaling having head information and content information;

FIG. 10 is a schematic diagram of a structure of an embodiment of content information of MAC signaling having head information and content information;

FIG. 11 is a schematic diagram of a structure of another embodiment of the content information of the MAC signaling having head information and content information;

FIG. 12 is a schematic diagram of a structure of still another embodiment of the content information of the MAC signaling having head information and content information;

FIG. 13 is a flowchart of an embodiment of the method for configuring modulation and coding scheme (MCS) of Embodiment 6 of the present disclosure;

FIG. 14 is a flowchart of another embodiment of the method for configuring modulation and coding scheme (MCS) of Embodiment 6 of the present disclosure;

DETAILED DESCRIPTION OF THE DISCLOSURE

Figure 15:
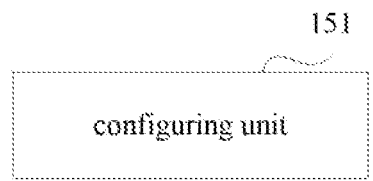
FIG. 15 is a schematic diagram of a structure of an eNB corresponding to the method of FIG. 8.

Various embodiments of the present disclosure shall be described below with reference to the accompanying drawings. These embodiments are illustrative only, and are not intended to limit the present disclosure. For the principle and embodiments of the present disclosure to be understood by those skilled in the art, the embodiments of the present disclosure shall be described taking configuration of a CQI index table and a TBS index table in an LTE system as an example. However, it should be understood by those skilled in the art that the embodiments of the present disclosure are not limited to the above system, and are applicable to other systems related to configuration of a CQI index table and a TBS index table.

In the embodiments of the present disclosure, in order to support a modulation format of a higher order, such as 256 QAM, a new "CQI index table" (corresponding to Table 1) is added into the standard, and the table may lower coding and modulation levels of the original 3 modulation manners (QPSK, 16 QAM and 64QAM) (embodied in a form of rows in a 4-bit CQI table), and increase a coding modulation level corresponding to the 256 QAM modulation, with a total number being still 16. Correspondingly, a new "modulation and TBS index table" (corresponding to Table 2) used for PDSCH and/or a new "modulation and TBS index table" (corresponding to Table 3) used for PUSCH may be added to correspond to the new "CQI index table". Furthermore, several rows needs to be added into a TBS table (see Table 4), so as to support the coding and modulation scheme modulated by the newly-added 256 QAM. Hence, both the "4-bit CQI table" and the "modulation and TBS index table" have two tables for selection, one of which being a corresponding table in the existing standard, and the other one being designed for UE of very high channel quality, which may support a table used by the UE and modulated by the 256 QAM, and is referred to as a new table in the embodiments of the present disclosure.

With the method of the embodiment of the present disclosure, the eNB may configure the UE with different '4-bit CQI tables' and/or 'modulation and TBS index tables' while keeping the CQI index and the $I_{MCS}$ bit number unchanged, so as to support a modulation format of a higher order.

In order that the method of this embodiment to be more clear and easy to be understood, the method of this embodiment shall be described below with reference to the accompanying drawings and particular embodiments.

Embodiment 1

An embodiment of the present disclosure provides a method for configuring channel quality indicator (CQI). FIG. 1 is a flowchart of the method. Referring to FIG. 1, the method includes:

step 101: configuring UE with a CQI index table by an eNB via CQI index table indication information, so that the UE determines the configured CQI index table according to the indication information, and calculates a CQI index according to calculated precoding matrix indicator (PMI) and rank indication (RI) by using the configured CQI index table.

In an implementation of this embodiment, the above CQI index indication information may be carried by RRC signaling. For example, the RRC signaling may be carried by a common information element used for configuring PUCCH transmission, referred to as RRC common signaling, and may also be carried by a UE-specific information element used for configuring PUCCH transmission, referred to as RRC specific signaling. The manner in which the above CQI index table indication information is carried by a PUCCH-ConfigCommon information element (RRC common signaling) shall be described below by way of Example 1 and Example 2.

Example 1

In this example, the eNB may add signaling used for configuring "a CQI index table" into the common signaling of the RRC layer. Hence, "a modulation and TBS index table" is also correspondingly impliedly configured, that is, the use of the new and old "CQI index tables" and the use of the new and old "modulation and TBS index tables" are consistent. Here, the "CQI index table" configured by the RRC common signaling and the corresponding "modulation and TBS index table" may be used for downlink transmission only, and may also be used for both uplink transmission and downlink transmission. The "CQI index table" and the corresponding "modulation and TBS index table" configured in such a manner may be used for a PCell (primary cell) only, and may also be used for both a PCell and a SCell (secondary cell).

In this implementation, as the RRC common signaling is employed, the "CQI index table" and the corresponding "modulation and TBS index table" configured in such a manner are cell specific, that is, all UEs in the cell use these tables.

In this example, the configured CQI index table is indicated by adding new signaling into the information element PUCCH-ConfigCommon. Following is a composition of the information element PUCCH-ConfigCommon.

```
PUCCH-ConfigCommon ::=      SEQUENCE {
    deltaPUCCH-Shift        ENUMERATED {ds1, ds2, ds3},
    nRB-CQI                 INTEGER (0..98),
    nCS-AN                  INTEGER (0..7),
    n1PUCCH-AN              INTEGER (0..2047)
    NewCQITable-r12             ENUMERATED {true}       OPTIONALNeed OR
}
```

In this implementation, "NewCQITable-r12" is newly-added signaling. This signaling is optional, and if "ENUMERATED {true}" is corresponded, the new "CQI index table" is configured for use, and if the signaling is not contained in the information element PUCCH-ConfigCommon, the original "CQI index table" is configured for use. Wherein, the meaning of "Need OR" is the same as that in an existing standard, which shall not be described herein any further, and the same below.

In an implementation of this example, the information element PUCCH-ConfigCommon may be contained in broadcast signaling, and is carried by the broadcast signaling. For example, the information element PUCCH-ConfigCommon may be contained in an information element RadioResourceConfigCommonSIB, and the information element RadioResourceConfigCommonSIB is contained in an information element SystemInformationBlockType2. Hence, the information used for configuring the CQI index table may be carried by the broadcast signaling.

In another implementation of this example, the information element PUCCH-ConfigCommon may also be contained in reconfiguration signaling used for RRC connection, and is carried by the reconfiguration signaling of RRC connection. For example, the information element PUCCH-ConfigCommon may be alternatively contained in an information element RadioResourceConfigCommon, and the information element RadioResourceConfigCommon is contained in an information element MobilityControlInfo. The information element MobilityControlInfo is usually used for handover, and may be alternatively contained in an information element RRCConnectionReconfiguration-r8-IEs. The information element RRCConnectionReconfiguration-r8-IEs is contained in an information element RRCConnectionReconfiguration, and the information element RRCConnectionReconfiguration is used for reconfiguration of RRC connection. Hence, the information used for configuring the CQI index table may be carried by the reconfiguration signaling used for RRC connection.

It can be seen from this example that if the "CQI index table" is configured (the corresponding "modulation and TBS index table" is indirectly configured) according to the method described in this embodiment, such configuration is cell specific. The configured information may be configured via the broad signaling, and may also be configured via the reconfiguration signaling of RRC connection. In such a case, configuration of "CQI index tables" and "modulation and TBS index tables" of all UEs in a cell are identical.

Example 2

In the LTE Release 11 and Release 10, only a PCell may transmit PUCCH to UE, and a SCell cannot transmit PUCCH to UE. In Release 12, if a SCell is also able to support PUCCH transmission, "CQI index tables" and "modulation and TBS index tables" may also be configured according to the method of this embodiment. In this example, the eNB may add corresponding signaling used for configuring "a CQI index table" used by a SCell into the common signaling of the RRC layer. Correspondingly, "a modulation and TBS index table" is also indirectly configured. The "CQI index tables" and the corresponding "modulation and TBS index tables" configured in such a manner may be used for downlink transmission only, and may also be used for both uplink transmission and downlink transmission.

Likewise, as the RRC common signaling is employed, the "CQI index tables" and the corresponding "modulation and TBS index tables" configured in such a manner are cell specific, that is, all UEs taking the cell as a SCell use these tables.

In this example, the configured CQI index table is indicated by adding new signaling into the information element PUCCH-ConfigCommon. Following is a composition of the information element PUCCH-ConfigCommon added with the above signaling.

```
PUCCH-ConfigCommon ::=      SEQUENCE {
    deltaPUCCH-Shift        ENUMERATED {ds1, ds2, ds3},
    nRB-CQI                 INTEGER (0..98),
    nCS-AN                  INTEGER (0..7),
    n1PUCCH-AN              INTEGER (0..2047)
    NewCQITable-r12         ENUMERATED {true}       OPTIONAL
    Need OR
}
```

Wherein, "NewCQITable-r12" is newly-added signaling. This signaling is optional, and if "ENUMERATED {true}" is corresponded, the new "CQI index table" is configured for use, and if the signaling is not contained in the information element PUCCH-ConfigCommon, the original "CQI index table" is configured for use.

In this example, the information element PUCCH-ConfigCommon may be contained in reconfiguration signaling used for RRC connection, and is carried by the reconfiguration signaling of RRC connection, and may also be contained in signaling used for handover preparation, and is carried by the signaling used for handover preparation.

For example, the information element PUCCH-ConfigCommon may be contained in an information element RadioResourceConfigCommonSCell-r10, as shown below:

```
RadioResourceConfigCommonSCell-r10 ::=      SEQUENCE {
    ...
    [[ ...
    pucch-ConfigCommon -r12     PUCCH-ConfigCommon      OPTIONAL
        ...
    ]]
    ...
}
```

In this implementation, the information element RadioResourceConfigCommonSCell-r10 may be contained in an information element SCellToAddMod-r10. One or more information elements SCellToAddMod-r10 constitute an information element SCellToAddModList-r10. In this implementation, the information element SCellToAddModList-r10 may be contained in an information element RRCConnectionReconfiguration-v1020-IEs. The information element RRCConnectionReconfiguration-v1020-IEs is packed layers by layers, and is finally contained in an information element RRCConnectionReconfiguration. The information element RRCConnectionReconfiguration is used for reconfiguration of RRC connection, and information contained in the information element RRCConnectionReconfiguration-v1020-IEs is used for reconfiguring a SCell. Hence, the information used for configuring the CQI index table may be carried by the signaling used for reconfiguration of RRC connection.

In this implementation, the information element SCellToAddModList-r10 may be contained in an information element AS-Config used for handover preparation. Hence, the information used for configuring the CQI index table may be carried by the signaling used for handover preparation of the UE.

It can be seen from this example that if the "CQI index table" is configured (the corresponding "modulation and TBS index table" is indirectly configured) according to the method described in this embodiment, such configuration is cell specific, that is, all UEs taking the cell as a SCell use these tables. The configured information may be configured via RRC connection reconfiguration signaling in configuring a SCell, and may also be interacted between a source eNB and a target eNB in handover preparation of the UE, that is, being configured via handover preparation signaling.

A manner of carrying the above CQI index table indication information by the PUCCH-ConfigDedicated-r12 information element (RRC-specific signaling) shall be described below by way of Example 3, and a manner of carrying the above configured CQI index table information by the PUCCH-ConfigDedicatedSCell-r12 information element (RRC-specific signaling) shall be described below by way of Example 4.

Example 3

In this example, the eNB may add signaling used for configuring "a CQI index table" into the specific signaling of RRC layer-. Hence, "a modulation and TBS index table" is also correspondingly impliedly configured. The "CQI index table" and the corresponding "modulation and TBS index table" configured in such a manner may be used for downlink transmission only, and may also be used for both downlink transmission and uplink transmission. And the "CQI index table" and the corresponding "modulation and TBS index table" configured in such a manner may be used for a PCell only, and may also be used for both a PCell and a SCell.

In this implementation, as the RRC specific signaling is employed, the "CQI index table" and the corresponding "modulation and TBS index table" configured in such a manner are UE specific, that is, all UEs in the cell use corresponding tables according to the configuration of its own.

In this example, a new information element used for indicating a configured CQI index table may be added into an information element PhysicalConfigDedicated. For example, a new information element PUCCH-ConfigDedicated-r12 used for indicating the configured CQI index table is added into the information element PhysicalConfigDedicated.

Following is a composition of the information element PUCCH-ConfigDedicated-r12.

```
PUCCH-ConfigDedicated-r12 ::=       SEQUENCE {
    ...
    NewCQITable-r12                 NUMERATED {true} -- Optional-- Need OR
    ...
}
```

Wherein, the meaning of "NewCQITable-r12" is the same as that described above, which shall not be described herein any further.

Following is a composition of the information element PhysicalConfigDedicated added with the above information element PUCCH-ConfigDedicated-r12, wherein, the meaning of "Need ON" is the same as that in an existing standard, which shall not be described herein any further, and the same below.

```
PhysicalConfigDedicated ::=     SEQUENCE {
    ...
    [[ ...
        pucch-ConfigDedicated-r12       PUCCH-ConfigDedicated-r12       OPTIONAL,
        -- Need ON
    ...
```

-continued

```
        ]],
        ...
}
```

In an implementation of this example, the information element PhysicalConfigDedicated may be contained in signaling used for initial setup of RRC connection. For example, the information element PhysicalConfigDedicated is contained in an information element RadioResourceConfigDedicated. The information element RadioResourceConfigDedicated is contained in an information element RRC-ConnectionSetup-r8-IEs. The information element RRCConnectionSetup-r8-IEs is contained in RRCConnectionSetup. The information element RRCConnectionSetup is used for initial setup of RRC connection. Hence, the information element PhysicalConfigDedicated may be carried by the signaling used for initial setup of RRC connection.

In another implementation of this example, the information element PhysicalConfigDedicated may also be contained in signaling used for reconfiguration of RRC connection. For example, the information element PhysicalConfigDedicated is contained in an information element RadioResourceConfigDedicated. The information element RadioResourceConfigDedicated is used for handover, and is alternatively contained in an information element RRCConnectionReconfiguration-r8-IEs. The information element RRCConnectionReconfiguration-r8-IEs is contained in an information element RRCConnectionReconfiguration. The information element RRCConnectionReconfiguration is used for reconfiguration of RRC connection. Hence, the information element PhysicalConfigDedicated may be carried by the signaling used for reconfiguration of RRC connection.

In a further implementation of this example, the information element PhysicalConfigDedicated may also be contained in signaling used for reestablishment of RRC connection. For example, the information element PhysicalConfigDedicated is contained in an information element RadioResourceConfigDedicated. The information element RadioResourceConfigDedicated is contained in an information element RRCConnectionReestablishment-r8-IEs. The information element RRCConnectionReestablishment-r8-IEs is contained in an information element RRCConnectionReestablishment. The information element RRCConnectionReestablishment is used for reestablishment of RRC connection. Hence, the information element PhysicalConfigDedicated may be carried by the signaling used for reestablishment of RRC connection.

In still another implementation of this example, the information element PhysicalConfigDedicated may also be contained in signaling used for handover preparation. For example, the information element PhysicalConfigDedicated is contained in an information element RadioResourceConfigDedicated. The information element RadioResourceConfigDedicated is contained in an information element AS-Config. The information element AS-Config is used for handover preparation. Hence, the information element PhysicalConfigDedicated may be carried by the signaling used for handover preparation.

It can be seen from this example that if the "CQI index table" is configured (the corresponding "modulation and TBS index table" is indirectly configured) according to the method described in this embodiment, such configuration is UE specific, that is, each UE uses corresponding table according to the configuration of its own. The configured information may be configured in setup of RRC connection, may be configured in reconfiguration of RRC connection, and may also be interacted between a source eNB and a target eNB in handover preparation of the UE.

Example 4

In this example, similar to Example 2, in Release 12, if a SCell is also able to support PUCCH transmission, "CQI index tables" and "modulation and TBS index tables" may also be configured according to the method of this embodiment. For example, the eNB may add signaling used for configuring "a CQI index table" into the specific signaling of RRC layer. Correspondingly, "a modulation and TBS index table" is also indirectly configured. The "CQI index tables" and the corresponding "modulation and TBS index tables" configured in such a manner may be used for downlink transmission only, and may also be used for both downlink transmission and uplink transmission.

Likewise, as the RRC-specific signaling is employed, the "CQI index tables" and the "modulation and TBS index tables" configured in such a manner are UE-specific, that is, each UE uses corresponding table according to the configuration of its own.

In this example, new signaling used for indicating the configured CQI index table may be added into an information element PhysicalConfigDedicatedSCell-r10. For example, a new information element PUCCH-ConfigDedicatedSCell-r12 used for indicating the configured CQI index table is added into the information element PhysicalConfigDedicatedSCell-r10.

Following is a composition of the information element PUCCH-ConfigDedicated-r12.

```
PUCCH-ConfigDedicatedSCell-r12 ::=    SEQUENCE {
        ...
        NewCQITable-r2                ENUMERATED {true}    -- Optional -- Need OR
        ...
}
```

Wherein, the meaning of "NewCQITable-r12" is the same as that described above, which shall not be described herein any further.

Following is a composition of the information element PhysicalConfigDedicatedSCell-r10 added with the information element PUCCH-ConfigDedicated-r12.

```
PhysicalConfigDedicatedSCell-r10 ::=                    SEQUENCE {
    ...
    -- UL configuration
    ul-Configuration-r10                                SEQUENCE {
        [[...
PUCCH-ConfigDedicatedSCell-r12    PUCCH-ConfigDedicatedSCell-r12 OPTIONAL, --
Need ON
        ...]]
    }                                                   OPTIONAL, -- Cond CommonUL
    ...
}
```

In an implementation of this example, the information element PhysicalConfigDedicatedSCell-r10 may be contained in signaling used for reconfiguration of RRC connection. For example, the information element PhysicalConfigDedicatedSCell-r10 is contained in an information element RadioResourceConfigDedicatedSCell-r10. The information element RadioResourceConfigDedicatedSCell-r10 is alternatively contained in SCellToAddMod-r10. One or more information elements SCellToAddMod-r10 constitute an information element SCellToAddModList-r10. The information element SCellToAddModList-r10 is contained in an information element RRCConnectionReconfiguration-v1020-IEs. The information element RRCConnectionReconfiguration-v1020-IEs is packed layers by layers, and is finally contained in an information element RRCConnectionReconfiguration. The information element RRCConnectionReconfiguration is used for reconfiguration of RRC connection, and information contained in the information element RRCConnectionReconfiguration-v1020-IEs is used for reconfiguring a SCell. Hence, the information element PhysicalConfigDedicatedSCell-r10 may be carried by the signaling used for reconfiguration of RRC connection.

In another implementation of this example, the information element PhysicalConfigDedicatedSCell-r10 may also be contained in signaling used for handover preparation. For example, the information element PhysicalConfigDedicatedSCell-r10 is contained in an information element RadioResourceConfigDedicatedSCell-r10. The information element RadioResourceConfigDedicatedSCell-r10 is alternatively contained in an information element SCellToAddMod-r10. One or more information elements SCellToAddMod-r10 constitute an information element SCellToAddModList-r10. The information element SCellToAddModList-r10 is contained in an information element AS-Config used for handover preparation. Hence, the information element PhysicalConfigDedicatedSCell-r10 may be carried by the signaling used for handover preparation.

It can be seen from this example that if the "CQI index table" is configured (the corresponding "modulation and TBS index table" is indirectly configured) according to the method described in this embodiment, such configuration is UE specific, that is, each UE uses corresponding table according to the configuration of its own. The configured information may be configured via the RRC connection reconfiguration signaling in configuring the SCell, and may be interacted between a source eNB and a target eNB in handover preparation of the UE.

Examples 1-4 are described taking that there is only one available candidate table (that is, there is only one new candidate table, except the tables provided in the standard) as an example; however, this embodiment is not limited thereto. When there are multiple available candidate tables, that is, when multiple CQI index tables and multiple corresponding modulation and TBS index tables are added into the standard, the eNB may indicate a corresponding table index via the above RRC common signaling or the above RRC-specific signaling. For example, the newly-added signaling is made to be in a form as below:

```
NewCQITable-r12    ENUMERATED {0,1,2,3}
or,
NewCQITable-r12    ENUMERATED {0,1,2,3}   Optional Need ON
```

In another implementation of this embodiment, the above CQI index table indication information may also be carried via medium access control (MAC) signaling. A manner of carrying the above CQI index table indication information via MAC signaling shall be described below by way of Example 5 and Example 6.

Example 5

In this example, if only two types of "CQI index tables" are supported in the standard (correspondingly, two types of "modulation and TBS index tables" are supported), one piece of MAC signaling having only header information is used to indicate the CQI index table, the header information containing designated LCID. If the eNB configures the UE with the MAC signaling, it shows that one type of the CQI index tables, such as the new table, is used; and if the eNB does not configure the UE with the MAC signaling, it shows that the other type of the CQI index tables, such as the old table, is used.

FIG. 2 is a schematic diagram of a structure of MAC signaling having only header information according to the method of this embodiment. As shown in FIG. 2, the eNB uses an MAC PDU subheader (header information) with designated LCID to define a CQI index Table Command MAC control element. Where, "R" is a reserved bit, which is set to be 0, and "E" is an expanded domain. The expanded domain is identification, which is used for indicating whether there is another domain in the MAC header; E being set to be 1 denotes that there is at least one other R/R/E/LCID domain, and E being set to be 0 denotes that there is an MAC SDU, and an MAC control element or padding starts in the next byte; and "LCID" denotes that a corresponding MAC CE is a CQI index Table Command MAC CE.

In an implementation of this example, which of the CQI index tables is selected is indicated by whether the CQI index Table Command MAC CE (MAC signaling) is configured. For example, if the eNB configures the UE with the CQI index Table Command MAC CE, it shows that the UE uses the new "CQI index table" in downlink transmission or downlink transmission and uplink transmission; otherwise, it shows that the old "CQI index table" is used. Wherein, when the CQI index Table Command MAC CE is configured, a "modulation and TBS index table" is also correspondingly configured indirectly.

Example 6

In this example, if more than two types of "CQI index tables" are supported in the standard (correspondingly, more than two types of "modulation and TBS index tables" are supported), one piece of MAC signaling having header information and content information is used to indicate the CQI index tables, similar to Example 5, the header information containing designated LCD, which is used to indicate that the MAC signaling is used to indicate CQI index tables, and the content information containing indices of the configured CQI index tables.

FIG. 3 is a schematic diagram of a structure of the header information of the MAC signaling according to the method of this embodiment. As shown in FIG. 3, the eNB uses an MAC PDU subheader with designated LCID to define a CQI index Table Command MAC control element. Where, "R" is a reserved bit, which is set to be 0, and "E" is an expanded domain. The expanded domain is identification, which is used for indicating whether there is another domain in the MAC header; E being set to be 1 denotes that there is at least one other R/R/E/LCID domain, and E being set to be 0 denotes that there is an MAC SDU, and an MAC control element or padding starts in the next byte; and "LCID" denotes that a corresponding MAC CE is a CQI index Table Command MAC CE.

FIG. 4 is a schematic diagram of a structure of the content information of the MAC signaling according to the method of this embodiment. As shown in FIG. 4, the MAC control element (content information) is of a fixed length, and is defined by a byte (octet) shown in FIG. 4. Where, "R" is a reserved bit, which is set to be 0, and the "CQI Idx Tab" domain is used to indicate indices of "CQI index tables" configured by the eNB for the UE. A length of the domain may be determined by a total number of the tables. Assuming that a number of available tables is x, the number of bits occupied by the domain is $\log_2(x)$; other bits than the bits occupied by the CQI Idx Tab domain are R bits, that is, R bits share $8-\log_2(x)$.

With the method of this embodiment of the present invention, the eNB configures the UE with CQI index table via RRC common signaling or RRC-specific signaling or MAC signaling, so that the UE determines a CQI index according to the CQI index table configured by the eNB for it, and feeds back CQI information. Therefore, not only the CQI index and the $I_{MCS}$ bit number need not to be increased, but also normal configuration of the LTE system may be ensured.

Embodiment 2

An embodiment of the present disclosure further provides a method for configuring channel quality indicator (CQI), which is processing at a UE side corresponding to the method of Embodiment 1. FIG. 5 is a flowchart of the method. Referring to FIG. 5, the method includes:

step 501: calculating PMI and RI by UE according to a channel estimated result;

In this implementation, during receiving downlink data or performing uplink and downlink data transmission by the UE, the UE will perform channel estimation in a conventional manner, and calculate the PMI and RI according to a channel estimated result; and a processing procedure is identical to that of the prior art, and shall not be described herein any further;

step 502: determining a configured CQI index table by the UE according to received CQI index table indication information transmitted by an eNB;

In this implementation, when the eNB configures the UE with the CQI index table needing to be used according to the method of Embodiment 1 or the method of Embodiment 5, the UE will determine the configured CQI index table needing to be used according to the received signaling carrying information of the configured CQI index table (such as RRC common signaling or RRC-specific signaling or MAC signaling);

In this implementation, a format of the signaling carrying the information of the configured CQI index table and a carrying manner have been described in Embodiment 1 or in Embodiment 5, the contents of which being incorporated herein, and being not going to be described herein any further;

step 503: calculating a CQI index by the UE according to the PMI and the RI by using the configured CQI index table;

In this implementation, after determining the CQI index table needing to be used, the UE may calculate the CQI index in a conventional manner, with the processing procedure being identical to the prior art, which shall not be described herein any further.

With the method of this embodiment, when a CQI index table supporting modulation of a higher order is added into the standard, the UE is able to calculate the CQI index based on the new table, and feed the calculated CQI information (including the CQI index, the PMI and the RI) back to the eNB, and the eNB may schedule and configure the UE according to realtime scheduling and load situation with reference to the CQI information fed back by the UE, thereby not only supporting modulation of a higher order, but also ensuring normal configuration of the LTE system.

An embodiment of the present disclosure further provides an eNB, as described in Embodiment 3 below. As a principle of the eNB for solve problems is similar to that of the method of Embodiment 1, the implementation of the method of Embodiment 1 may be referred to for a particular implementation of the eNB, and the repeated parts shall not be described herein any further.

Embodiment 3

An embodiment of the present disclosure provides an eNB. FIG. 6 is a schematic diagram of a structure of the eNB. Referring to FIG. 6, the eNB includes:

a configuring unit 61 configured to configure UE with a CQI index table via CQI index table indication information, so that the UE determines the configured CQI index table according to the indication information, and calculates a CQI index according to calculated precoding matrix indicator (PMI) and rank indication (RI) by using the configured CQI index table.

Similar to examples 1 and 2 in Embodiment 1, in an implementation, the configuring unit 61 carries the CQI index table indication information via RRC signaling. Wherein, the configuring unit may carry the RRC signaling via a common information element used for configuring PUCCH transmission. For example, the CQI index table indication information is carried by an information element PUCCH-ConfigCommon. Wherein, the information element PUCCH-ConfigCommon is contained in broadcast signaling, or in signaling used for reconfiguration of RRC connection, or in signaling used for handover preparation.

Similar to examples 3 and 4 in Embodiment 1, in an implementation, the configuring unit 61 carries the CQI index table indication information via RRC signaling. Wherein, the configuring unit may carry the RRC signaling via a UE-specific information element used for configuring PUCCH transmission. For example, the CQI index table indication information is carried by an information element PUCCH-ConfigDedicated-r12, or information of the CQI index table is carried via an information element PUCCH-ConfigDedicatedSCell-r12. Wherein, the information element PUCCH-ConfigDedicated-r12 may be contained in signaling used for initial setup of RRC connection, or may be contained in signaling used for reconfiguration of RRC connection, or may be contained in signaling used for reestablishment of RRC connection, or may be contained in signaling used for handover preparation. And wherein, the information element PUCCH-ConfigDedicatedSCell-r12 may be contained in signaling used for reconfiguration of RRC connection, or may be contained in signaling used for handover preparation.

Similar to Example 5 in Embodiment 1, in an implementation, when two CQI index tables are configured in the standard (correspondingly, two modulation and TBS index tables are configured), the configuring unit 61 carries the CQI index table indication information via MAC signaling. For example, the CQI index table is indicated by MAC signaling having specific indication information, such as MAC signaling having only header information, the header information containing designated LCID. Hence, the UE may determine the CQI index table configured by the eNB for it (i.e. the CQI index table that the UE needs to use) according to whether MAC signaling having specific indication information is received.

Similar to Example 6 in Embodiment 1, in an implementation, when more than two CQI index tables are configured in the standard (correspondingly, more than two modulation and TBS index tables are configured), the configuring unit 61 carries the CQI index table indication information via MAC signaling. For example, the CQI index table is indicated by MAC signaling having specific indication information, such as MAC signaling having header information and content information, the header information containing designated LCD, and the content information containing an index of the configured CQI index table. Hence, the UE may determine the configured CQI index table (i.e. the CQI index table that the UE needs to use) according to the received MAC signaling having specific indication information.

By configuring the UE with the CQI index table that the UE needs to use by the eNB of this embodiment via RRC common signaling or RRC-specific signaling or MAC signaling, multiple tables may be supported, that is, CQI index tables supporting modulation of a higher order may be added into the standard, thereby not only supporting modulation of a higher order, but also ensuring normal configuration of the LTE system.

An embodiment of the present disclosure further provides UE, as described in Embodiment 4 below. As a principle of the UE for solve problems is similar to that of the method of Embodiment 2, the implementation of the method of Embodiment 2 may be referred to for a particular implementation of the UE, and the repeated parts shall not be described herein any further.

Embodiment 4

An embodiment of the present disclosure provides UE. FIG. 7 is a schematic diagram of a structure of the UE. Referring to FIG. 7, the UE includes:

a first calculating unit 71 configured to calculate PMI and RI according to a channel estimated result;

a determining unit 72 configured to determine a configured CQI index table according to received CQI index table indication information transmitted by an eNB;

In this implementation, the CQI index table indication information transmitted by the eNB may be configured by using the method of Embodiment 1, or may be configured by using the method of Embodiment 5, which shall not be described herein any further;

a second calculating unit 73 configured to calculate a CQI index according to the PMI and the RI calculated by the first calculating unit 71 by using the CQI index table configured by the eNB for the UE determined by the determining unit 72.

Similar to examples 1 and 2 in Embodiment 1, in an implementation, the configuring unit 61 carries the CQI index table indication information via RRC signaling. Wherein, the configuring unit may carry the RRC signaling via a common information element used for configuring PUCCH transmission. For example, the CQI index table indication information is carried by an information element PUCCH-ConfigCommon. Wherein, the information element PUCCH-ConfigCommon is contained in broadcast signaling, or in signaling used for reconfiguration of RRC connection, or in signaling used for handover preparation.

Similar to examples 3 and 4 in Embodiment 1, in an implementation, the configuring unit 61 carries the CQI index table indication information via RRC signaling. Wherein, the configuring unit may carry the RRC signaling via a UE-specific information element used for configuring PUCCH transmission. For example, the CQI index table indication information is carried via an information element PUCCH-ConfigDedicated-r12, or the CQI index table indication information is carried via an information element PUCCH-ConfigDedicatedSCell-r12. Wherein, the information element PUCCH-ConfigDedicated-r12 may be contained in signaling used for initial setup of RRC connection, or may be contained in signaling used for reconfiguration of RRC connection, or may be contained in signaling used for reestablishment of RRC connection, or may be contained in signaling used for handover preparation. And wherein, the information element PUCCH-ConfigDedicatedSCell-r12 may be contained in signaling used for reconfiguration of RRC connection, or may be contained in signaling used for handover preparation.

Similar to Example 5 in Embodiment 1, in an implementation, when two CQI index tables are configured in the standard (correspondingly, two modulation and TBS index tables are configured), the configuring unit 61 carries the CQI index table indication information via MAC signaling. For example, the CQI index table is indicated by MAC signaling having specific indication information, such as MAC signaling having only header information, the header information containing designated LCID. Hence, the UE may determine the CQI index table configured by the eNB for it (i.e. the CQI index table that the UE needs to use) according to whether MAC signaling having specific indication information is received.

Similar to Example 6 in Embodiment 1, in an implementation, when more than two CQI index tables are configured in the standard (correspondingly, more than two modulation and TBS index tables are configured), the configuring unit 61 carries the CQI index table indication information via MAC signaling. For example, the CQI index table is indicated by MAC signaling having specific indication information, such as MAC signaling having header information and content information, the header information containing designated LCD, and the content information containing an index of the configured CQI index table. Hence, the UE may determine the configured CQI index table (i.e. the CQI index table that the UE needs to use) according to the received MAC signaling having specific indication information.

In this embodiment, the manner of carrying the CQI index table indication information received by the UE is described taking that the UE is configured with the CQI index table according to the method of Embodiment 1 as an example. However, the embodiment of the present disclosure is not limited thereto, and the eNB may also indirectly (impliedly) configure the UE with the CQI index table in configuring the UE with the modulation and TBS index table according to the method of Embodiment 5. And at this moment, the UE of this embodiment may still determine the CQI index table configured by the eNB for the UE by using the determining unit 72 according to the received CQI index table indication information transmitted by the eNB. By configuring the UE of this embodiment with the CQI index table that the UE needs to use by the eNB via RRC common signaling or RRC-specific signaling or MAC signaling, multiple tables may be supported, that is, CQI index tables supporting modulation of a higher order may be added into the standard, thereby not only supporting modulation of a higher order, but also ensuring normal configuration of the LTE system.

Embodiment 5

An embodiment of the present disclosure provides a method for configuring modulation and coding scheme (MCS). FIG. 8 is a flowchart of the method. Referring to FIG. 8, the method includes:

step 801: configuring UE by an eNB with a modulation and transport block size (TBS) index table used for downlink transmission, and/or a modulation and TBS index table needed in uplink transmission, via modulation and TBS index table indication information, so that the UE, after receiving the indication information, determines the MCS configured by the eNB for it according to the modulation and TBS index table used for downlink transmission and/or the modulation and TBS index table needed in uplink transmission.

In an implementation of this embodiment, the eNB may carry the modulation and TBS index table indication information employed in uplink transmission and/or downlink transmission via RRC common signaling.

For example, the modulation and TBS index table indication information employed in the downlink transmission may be carried by an information element PDSCH-Config-Common, the information element PDSCH-ConfigCommon being contained in broadcast signaling, or being contained in signaling used for reconfiguration of RRC connection, or being contained in signaling used for handover preparation.

For example, the modulation and TBS index table indication information employed in the uplink transmission may be carried by an information element PUSCH-ConfigCommon, the information element PUSCH-ConfigCommon being contained in broadcast signaling, or being contained in signaling used for reconfiguration of RRC connection, or being contained in signaling used for handover preparation.

The method of carrying the modulation and TBS index table indication information employed in uplink transmission and/or downlink transmission via RRC common signal shall be described below by way of examples.

Example 7

During data transmission, the modulation and TBS index tables employed in uplink transmission and downlink transmission may be impliedly (indirectly) configured after the "CQI index tables" needing to be used are configured by an eNB to UE according to the method of Embodiment 1 (that is, the use of the new and old "CQI index tables" and the use of the new and old "modulation and TBS index tables" are consistent). And the "modulation and TBS index tables" employed in uplink transmission and downlink transmission may also be configured respectively.

Wherein, for the manner of indirect configuration, when the eNB configures the UE with the CQI index tables needing to be used according to the method of Embodiment 1, the eNB will transmit $I_{MCS}$ to the UE according to the modulation and TBS index tables corresponding to the configured CQI index tables. Hence, the UE may look up a corresponding modulation and TBS index table according to the received $I_{MCS}$, and hence perform demodulation and decoding of the downlink transmission, or demodulation and decoding of the downlink transmission and modulation and coding of the uplink transmission, according to an obtained TBS index. Thus, the scheme of indirect configuration shall not be described herein any further.

Wherein, a manner of respectively configuring the TBS index tables employed in uplink transmission and downlink transmission shall be described in this embodiment. In this example, the "TBS index table" for the uplink transmission may only be configured, or the "TBS index table" for the downlink transmission may only be configured, or both the "TBS index table" for the uplink transmission and the "TB S index table" for the downlink transmission may be configured.

This example takes that the "TB S index table" for the uplink transmission and/or the downlink transmission is added into the RRC common signaling as an example. In such a case, "a CQI index table" is indirectly configured, that is, the use of the new and old downlink "modulation and TBS index tables" and the use of the new and old "CQI index tables" are consistent.

In this example, as the RRC common signaling configured with the "modulation and TBS index tables" is employed, the "modulation and TBS index tables" and the corresponding "CQI index tables" configured in such a manner are cell specific, that is, all UEs in the cell use these tables.

In this example, signaling used for configuring modulation and TBS index tables for downlink transmission may be added into an information element PDSCH-ConfigCommon, as shown below:

```
PDSCH-ConfigCommon ::=      SEQUENCE {
    referenceSignalPower        INTEGER (-60..50),
    p-b                         INTEGER (0..3)
    NewDLModAndTBSTable-r12     ENUMERATED {true}    Optional    Need OR
}
```

Wherein, "NewDLModAndTBSTable-r12" is newly-added signaling, which is used for indicating the configured modulation and TBS index table for downlink transmission, for example, this signaling is optional, and if "ENUMERATED {true}" is corresponded, the new downlink "modulation and TBS index table" is configured for use, and if the signaling is not contained in the information element PUCCH-ConfigCommon, the original downlink "modulation and TBS index table" is configured for use.

In this example, signaling used for configuring modulation and TBS index table for uplink transmission may be added into the information element PUSCH-ConfigCommon, as shown below:

```
PUSCH-ConfigCommon ::=          SEQUENCE {
    pusch-ConfigBasic           SEQUENCE {
        n-SB                        INTEGER (1..4),
        hoppingMode                 ENUMERATED {interSubFrame,
intraAndInterSubFrame},
        pusch-HoppingOffset         INTEGER (0..98),
        enable64QAM                 BOOLEAN
    },
    ul-ReferenceSignalsPUSCH        UL-ReferenceSignalsPUSCH
NewULModAndTBSTable-r12         ENUMERATED {true}        Optional    Need OR
}
```

Wherein, "NewULModAndTBSTable-r12" is newly-added signaling, which is used for indicating the configured modulation and TBS index table for uplink transmission, for example, this signaling is optional, and if "ENUMERATED {true}" is corresponded, the new uplink "modulation and TBS index table" is configured for use, and if the signaling is not contained in the information element PUCCH-ConfigCommon, the original uplink "modulation and TBS index table" is configured for use.

In an implementation of this example, both the information element PUSCH-ConfigCommon and the information element PDSCH-ConfigCommon may be contained in an information element RadioResourceConfigCommonSIB. The information element RadioResourceConfigCommonSIB is contained in an information element SystemInformationBlockType2. Hence, the information used for configuring "modulation and TBS index table" of downlink/uplink transmission may be carried by broadcast signaling.

In another implementation of this example, the information element PUSCH-ConfigCommon may also be contained in an information element RadioResourceConfigCommon, and the information element PDSCH-ConfigCommon may also be alternatively contained in the information element RadioResourceConfigCommon. The information element RadioResourceConfigCommon may be contained in an information element MobilityControlInfo. The information element MobilityControlInfo is usually used for handover, and may be alternatively contained in an information element RRCConnectionReconfiguration-r8-IEs. The information element RRCConnectionReconfiguration-r8-IEs is contained in an information element RRCConnectionReconfiguration, and the information element RRCConnectionReconfiguration is used for reconfiguration of RRC connection.

In this implementation, the information of the "modulation and TBS index table" used for configuring uplink/downlink transmission of the PCell may be configured via the signaling of the reconfiguration of RRC connection in the reconfiguration of RRC connection.

In anther implementation of this example, the information element PUSCH-ConfigCommon and the information element PDSCH-ConfigCommon may also be contained in a RadioResourceConfigCommonSCell-r10 information element. The information element RadioResourceConfigCommonSCell-r10 may be contained in an information element SCellToAddMod-r10. One or more information elements SCellToAddMod-r10 constitute an information element SCellToAddModList-r10.

In this implementation, the information element SCellToAddModList-r10 may be contained in an information element RRCConnectionReconfiguration-v1020-IEs. The information element RRCConnectionReconfiguration-v1020-IEs is packed layers by layers, and is finally contained in an information element RRCConnectionReconfiguration. The information element RRCConnectionReconfiguration is used for reconfiguration of RRC connection, and information contained in the information element RRCConnectionReconfiguration-v1020-IEs is used for reconfiguring a SCell. Hence, the information element PUSCH-ConfigCommon and the information element PDSCH-ConfigCommon may further be carried by the signaling used for reconfiguration of RRC connection.

In this implementation, the information element SCellToAddModList-r10 may be contained in an information element AS-Config used for handover preparation. Hence, the information element PUSCH-ConfigCommon and the information element PDSCH-ConfigCommon may further be carried by the signaling used for handover preparation.

In this implementation, the information of the "modulation and TBS index tables" used for configuring uplink/downlink transmission of the SCell may be configured via the reconfiguration of RRC connection in the configuration of the SCell, and may also be interacted between a source eNB and a target eNB in the handover preparation of the UE.

In anther implementation of this embodiment, the eNB may carry the indication information of the modulation and TBS index table employed in uplink transmission and/or downlink transmission via RRC-specific signaling.

For example, the indication information of the modulation and TBS index table employed in the downlink transmission may be carried by an information element PDSCH-ConfigDedicated. The information element PDSCH-ConfigDedicated may be contained in signaling used for initial setup of RRC connection, may be contained in signaling used for initial setup of RRC connection, may be contained in signaling used for reconfiguration of RRC connection, may be contained in signaling used for reestablishment of RRC connection, and may also be contained in signaling used for handover preparation.

For example, the indication information of the modulation and TB S index table employed in the uplink transmission may be carried by an information element PUSCH-ConfigDedicated-v1020, and may also be carried by an information element PUSCH-ConfigDedicatedSCell-r10. The information element PUSCH-ConfigDedicated-v1020 may be contained in signaling used for initial setup of RRC connection, or may be contained in signaling used for reconfiguration of RRC connection, or may be contained in signaling used for reestablishment of RRC connection, or may be contained in signaling used for handover preparation. And the information element PUSCH-ConfigDedicatedSCell-r10 may be contained in signaling used for reconfiguration of RRC connection, or may be contained in signaling used for handover preparation.

The method of carrying the indication information of the modulation and TBS index table employed in uplink transmission and/or downlink transmission by using RRC-specific signaling shall be described below by way of an example.

Example 8

As described in Example, 7, during data transmission, the modulation and TBS index tables employed in uplink transmission and downlink transmission may be configured respectively. In this example, similar to Example 7, the "modulation and TBS index table" for the uplink transmission may only be configured, or the "modulation and TBS index table" for the downlink transmission may only be configured, or both the "modulation and TBS index table" for the uplink transmission and the "modulation and TBS index table" for the downlink transmission may be configured.

This example takes that the "modulation and TBS index table" for the uplink transmission and/or the downlink transmission is added into the RRC-specific signaling as an example. In such a case, "a CQI index table" is indirectly configured, that is, the use of the new and old downlink "modulation and TBS index tables" and the use of the new and old "CQI index tables" are consistent.

In this example, as the RRC-specific signaling configured with the "modulation and TBS index table" is employed, the downlink and/or uplink "modulation and TBS index table" and the corresponding "CQI index table" configured in such a manner are UE specific, that is, each UE uses corresponding table according to the configuration of its own.

In this example, signaling used for configuring modulation and TBS index table for downlink transmission may be added into an information element PDSCH-ConfigDedicated, as shown below:

```
PDSCH-ConfigDedicated::=    SEQUENCE{
      p-a                   ENUMERATED {
                                dB-6, dB-4dot77, dB-3, dB-1dot77,
                                dB0, dB1, dB2, dB3}
      NewDLModAndTBSTable-r12    ENUMERATED {true}         Optional       Need OR
}
```

In this example, the meaning of "NewDLModAndTBSTable-r12" is the same as that described in Example 7, which shall not be described herein any further.

In this example, signaling used for configuring modulation and TBS index table for uplink transmission may further be added into the information element PUSCH-ConfigDedicated-v1020, as shown below:

```
PUSCH-ConfigDedicated-v1020 ::=            SEQUENCE {
      betaOffsetMC-r10                     SEQUENCE {
          betaOffset-ACK-Index-MC-r10          INTEGER (0..15),
          betaOffset-RI-Index-MC-r10           INTEGER (0..15),
          betaOffset-CQI-Index-MC-r10          INTEGER (0..15)
      }                                                         OPTIONAL,    -- Need OR
      groupHoppingDisabled-r10             ENUMERATED {true}                 OPTIONAL,
      -- Need OR
      dmrs-WithOCC-Activated-r10           ENUMERATED {true}                 OPTIONAL
      -- Need OR
      [[
      NewULModAndTBSTable-r12              ENUMERATED {true}                 OPTIONAL
      Need OR
      ]]
}
```

In this example, the meaning of "NewULModAndTBSTable-r12" is the same as that described in Example 7, which shall not be described herein any further.

In this example, signaling used for configuring modulation and TBS index table for uplink transmission may further be added into the information element PUSCH-ConfigDedicatedSCell-r10, as shown below:

```
PUSCH-ConfigDedicatedSCell-r10 ::=    SEQUENCE {
      groupHoppingDisabled-r10            ENUMERATED {true}         OPTIONAL,
      -- Need OR
      dmrs-WithOCC-Activated-r10          ENUMERATED {true}         OPTIONAL
      -- Need OR
      [[
```

| NewULModAndTBSTable-r12 | ENUMERATED {true} | OPTIONAL |
| --- | --- | --- |
| Need OR | | |
| ]] | | |
}

In this example, the meaning of "NewULModAndTBSTable-r12" is the same as that described in Example 7, which shall not be described herein any further.

In an implementation of this example, the information element PDSCH-ConfigDedicated and the information element PUSCH-ConfigDedicated-v1020 may be contained in an information element PhysicalConfigDedicated. The information element PhysicalConfigDedicated is contained in an information element RadioResourceConfigDedicated.

In this example, the information element RadioResourceConfigDedicated may be contained in an information element RRCConnectionSetup-r8-IEs. The information element RRCConnectionSetup-r8-IEs is contained in RRCConnectionSetup. The information element RRCConnectionSetup is used for initial setup of RRC connection. Hence, the information element PDSCH-ConfigDedicated and the information element PUSCH-ConfigDedicated-v1020 may be carried by signaling used for initial setup of RRC connection.

In this example, the information element RadioResourceConfigDedicated may be used for handover, and may be alternatively contained in an information element RRCConnectionReconfiguration-r8-IEs. The information element RRCConnectionReconfiguration-r8-IEs is contained in an information element RRCConnectionReconfiguration. The information element RRCConnectionReconfiguration is used for reconfiguration of RRC connection. Hence, the information element PDSCH-ConfigDedicated and the information element PUSCH-ConfigDedicated-v1020 may be carried by signaling used for reconfiguration of RRC connection.

In this example, the information element RadioResourceConfigDedicated may also be contained in an information element RRCConnectionReestablishment-r8-IEs. The information element RRCConnectionReestablishment-r8-IEs is contained in an information element RRCConnectionReestablishment. The information element RRCConnectionReestablishment is used for reestablishment of RRC connection. Hence, the information element PDSCH-ConfigDedicated and the information element PUSCH-ConfigDedicated-v1020 may be carried by signaling used for reestablishment of RRC connection.

In this example, the information element RadioResourceConfigDedicated may further be contained in an information element AS-Config used for handover preparation. Hence, the information element PDSCH-ConfigDedicated and the information element PUSCH-ConfigDedicated-v1020 may be carried by the signaling used for handover preparation. In this implementation, if the "modulation and TBS index tables" for the uplink and downlink transmission are configured by using the method of this embodiment, such configuration is UE specific, that is, each UE uses corresponding table according to the configuration of its own. The information is configured by using the RRC-specific signaling in setup of RRC connection, in reconfiguration of RRC connection, or in reestablishment of RRC connection, and may also be interacted between a source eNB and a target eNB in the handover preparation of the UE.

In anther implementation of this embodiment, both the information element PDSCH-ConfigDedicated and the information element PUSCH-ConfigDedicatedSCell-r10 may be contained in an information element PhysicalConfigDedicatedSCell-r10. The information element PhysicalConfigDedicatedSCell-r10 is contained in an information element RadioResourceConfigDedicatedSCell-r10. The information element RadioResourceConfigDedicatedSCell-r10 may be alternatively contained in SCellToAddMod-r10. One or more information elements SCellToAddMod-r10 constitute an information element SCellToAddModList-r10.

In this implementation, the information element SCellToAddModList-r10 may be contained in an information element RRCConnectionReconfiguration-v1020-IEs. The information element RRCConnectionReconfiguration-v1020-IEs is packed layers by layers, and is finally contained in an information element RRCConnectionReconfiguration. The information element RRCConnectionReconfiguration is used for reconfiguration of RRC connection, and information contained in the information element RRCConnectionReconfiguration-v1020-IEs is used for reconfiguring a SCell. Hence, the information element PDSCHConfigDedicated and the information element PUSCH-ConfigDedicatedSCell-r10 may be carried by the signaling used for reconfiguration of RRC connection.

In this implementation, the information element SCellToAddModList-r10 may further be contained in an information element AS-Config used for handover preparation. Hence, the information element PDSCHConfigDedicated and the information element PUSCH-ConfigDedicatedSCell-r10 may be carried by the signaling used for handover preparation.

In this implementation, if the "modulation and TBS index tables" for the uplink and downlink transmission of the SCell are configured by using the method of this embodiment, such configuration is UE specific, that is, each UE uses corresponding table according to the configuration of its own. The information is configured via reconfiguration of RRC connection in configuring the SCell, and may also be interacted between a source eNB and a target eNB in the handover preparation of the UE.

Examples 7 and 8 are described taking that there is only one available candidate table (that is, there is only one new candidate table, except the tables provided in the standard) as an example; however, this embodiment is not limited thereto. When there are multiple available candidate tables, that is, when multiple corresponding modulation and TBS index tables and multiple corresponding CQI index tables are added into the standard, the eNB may indicate a corresponding table index via the above RRC common signaling or the above RRC-specific signaling. For example, the newly-added signaling is made to be in a form as below:

| | |
|---|---|
| NewDLModAndTBSTable-r12 | ENUMERATED {0,1,2,3} |
| or, | |
| NewULModAndTBSTable-r12 | ENUMERATED {0,1,2,3} |
| or, | |
| NewDLModAndTBSTable-r12 | ENUMERATED{0,1,2,3}  Optional  Need ON |
| or, | |
| NewULModAndTBSTable-r12 | ENUMERATED JO, 1,2,3} Optional  Need ON |

In another implementation of this embodiment, the eNB may carry the indication information of the modulation and TBS index tables employed in uplink transmission and/or downlink transmission via MAC signaling. The MAC signaling is MAC signaling having only header information, or the MAC signaling is MAC signaling having header information and content information, the header information containing designated LCID, and the content information containing the modulation and TBS index table employed in uplink transmission and/or the modulation and TBS index table employed in downlink transmission.

The method of carrying the indication information of the modulation and TBS index table employed in uplink transmission and/or downlink transmission by using MAC signaling shall be described below by way of an example.

Example 9

In this example, the modulation and TBS index tables employed in uplink transmission and downlink transmission are separately configured via signaling of an MAC layer (the "CQI index tables" are indirectly configured, that is, the use of the new and old "modulation and TBS index tables" and the use of the new and old "CQI index tables" are consistent).

FIG. 9 is a schematic diagram of a structure of header information of MAC signaling according to the method of this embodiment. As shown in FIG. 9, the eNB uses an MAC PDU subheader with designated LCID to define a Mod and TBS Table Command MAC control element. Where, "R" is a reserved bit, which is set to be 0, and "E" is an expanded domain. The expanded domain is identification, which is used for indicating whether there is another domain in the MAC header; E being set to be 1 denotes that there is at least one other R/R/E/LCID domain, and E being set to be 0 denotes that there is an MAC SDU, and an MAC control element or padding starts in the next byte; and "LCID" denotes that a corresponding MAC CE is a Mod and TBS Table Command MAC CE.

FIG. 10 is a schematic diagram of a structure of an embodiment of content information of the MAC signaling according to the method of this embodiment. In this embodiment, the MAC control element is of a fixed length, and is defined by a byte (octet) shown in FIG. 10. Where, "R" is a reserved bit, which is set to be 0, and the "DL Mod and TBS Tab" domain is used to indicate indices of downlink "modulation and TBS index tables" configured by the eNB for the UE. A length of the domain may be determined by a total number of available downlink "modulation and TBS index tables". For example, assuming that a number of available tables is $x_{DL}$, the number of bits occupied by the domain is $\log_2(x_{DL})$; other bits than the bits occupied by the DL Mod and TBS Tab domain are R bits, that is, R bits share $8-\log_2(x_{DL})$.

FIG. 11 is a schematic diagram of a structure of another embodiment of the content information of the MAC signaling according to the method of this embodiment. In this embodiment, the MAC control element is of a fixed length, and is defined by a byte (octet) shown in FIG. 11. Where, "R" is a reserved bit, which is set to be 0, and the "UL Mod and TBS Tab" domain is used to indicate indices of uplink "modulation and TBS index tables" configured by the eNB for the UE. A length of the domain may be determined by a total number of available uplink "modulation and TBS index tables". For example, assuming that a number of available tables is $x_{UL}$, the number of bits occupied by the domain is $\log_2(x_{UL})$; other bits than the bits occupied by the UL Mod and TB S Tab domain are R bits, that is, R bits share $8-\log_2(x_{UL})$.

FIG. 12 is a schematic diagram of a structure of still another embodiment of the content information of the MAC signaling according to the method of this embodiment. In this embodiment, the MAC control element is of a fixed length, and is defined by a byte (octet) shown in FIG. 12. Where, "R" is a reserved bit, which is set to be 0, and the "UL Mod and TBS Tab" domain is used to indicate indices of uplink "modulation and TBS index tables" configured by the eNB for the UE. A length of the domain may be determined by a total number of available uplink "modulation and TBS index tables". For example, assuming that a number of available tables is $x_{UL}$, the number of bits occupied by the domain is $\log_2(x_{UL})$; The "DL Mod and TBS Tab" domain is used to indicate indices of downlink "modulation and TBS index tables" configured by the eNB for the UE. A length of the domain may be determined by a total number of available downlink "modulation and TBS index tables". Assuming that a number of available tables is $x_{DL}$, the number of bits occupied by the domain is $\log_2(x_{DL})$; other bits than the bits occupied by the UL Mod and TBS Tab domain and the DL Mod and TBS Tab domain are R bits, that is, R bits share $8-\log_2(x_{UL})-\log_2(x_{DL})$.

With the method of this embodiment of the present disclosure, the eNB configures the UE with modulation and TBS index tables via RRC common signaling or RRC-specific signaling or MAC signaling, so that the UE looks up a corresponding table according to the received $I_{MCS}$ to determine the TBS, and performs demodulation and decoding of downlink data or modulation and coding of uplink data according to the determined TBS. Therefore, not only the CQI index and the $I_{MCS}$ bit number need not to be increased, but also normal configuration of the LTE system may be ensured.

Embodiment 6

An embodiment of the present disclosure further provides a method for configuring modulation and coding scheme (MCS), which is processing at a UE side corresponding to the method of Embodiment 5. FIGS. 13 and 14 are flowcharts of the method.

Referring to FIG. 13, the method includes:

step 1301: determining a modulation and TBS index table used for downlink transmission by UE according to received modulation and TBS index table indication information transmitted by an eNB;

In this implementation, the modulation and TBS index table indication information may be carried and transmitted by using the method of Embodiment 5, and may also be indirectly (impliedly) configured and transmitted by using the method of Embodiment 1, the contents of which being incorporated herein, and being not going to be described herein any further;

step 1302: determining, by the UE according to the modulation and TBS index table used for downlink transmission, the MCS configured by the eNB for it.

In this implementation, when the modulation and TBS index table used for downlink transmission is determined, the UE may determine the corresponding TBS by looking up the table according to the received modulation and TBS index table indication information, with a particular manner of looking up a table being identical to that in the prior art, and being not going to be described herein any further. The UE may determine a size of an information bit of a transport block by looking up the TBS table according to the found TBS, hence obtaining a code rate indirectly, and perform demodulation and decoding of downlink data by using the obtained code rate. Wherein, if the determined "modulation and TBS index table" is an old table, the TBS table may be Table 4 in the Background Art, and if the determined "modulation and TBS index table" is a new table, the TBS table may be a table corresponding to Table 4 with added rows. Wherein, a method of demodulation and decoding is identical to that in the prior art, and shall not be described herein any further.

With the method of FIG. 13, after determining the coding and modulation scheme configured by the eNB for the UE, the UE may perform demodulation and decoding of downlink data. Therefore, not only the $I_{MCS}$ bit number is not increased, but also normal configuration of the LTE system is ensured.

Referring to FIG. 14, the method includes:

step 1401: determining a modulation and TBS index table needed in uplink transmission by UE according to received modulation and TBS index table indication information transmitted by an eNB;

wherein, the modulation and TBS index table indication information may be carried and transmitted by using the method of Embodiment 5, and may also be indirectly (impliedly) configured and transmitted by using the method of Embodiment 1, the contents of which being incorporated herein, and being not going to be described herein any further;

step 1402: determining, by the UE according to the modulation and TBS index table needed in uplink transmission, the MCS configured by the eNB for it.

Wherein, when the modulation and TBS index table used for uplink transmission is determined, the UE may determine the corresponding TBS by looking up the table according to the received modulation and coding scheme indication information, with a particular manner of looking up a table being identical to that in the prior art, and being not going to be described herein any further. The UE may determine a size of an information bit of a transport block by looking up the TBS table according to the found TBS, hence obtaining a code rate indirectly, and perform modulation and coding of uplink data by using the obtained code rate. Wherein, if the determined "modulation and TBS index table" is an old table, the TBS table may be Table 4 in the Background Art, and if the determined "modulation and TBS index table" is a new table, the TBS table may be a table corresponding to Table 4 with added rows. Wherein, a method of modulation and coding is identical to that in the prior art, and shall not be described herein any further.

With the method of FIG. 14, after determining the coding and modulation scheme configured by the eNB for the UE, the UE may perform modulation and coding of uplink data. Therefore, not only the $I_{MCS}$ bit number is not increased, but also multiple "modulation and TBS index tables" are supported, and normal configuration of the LTE system is ensured.

An embodiment of the present disclosure further provides an eNB, as described in Embodiment 7 below. As a principle of the eNB for solve problems is similar to that of the method of Embodiment 5, the implementation of the method of Embodiment 5 may be referred to for a particular implementation of the eNB, and the repeated parts shall not be described herein any further.

Embodiment 7

An embodiment of the present disclosure provides an eNB. FIG. 15 is a schematic diagram of a structure of the eNB. Referring to FIG. 15, the eNB includes:

a configuring unit 151 configured to configure UE with a modulation and TBS index table used for downlink transmission, and/or a modulation and TBS index table needed in uplink transmission, via modulation and TBS index table indication information, so that the UE, after receiving the indication information, determines the MCS configured by the eNB for it according to the modulation and TBS index table used for downlink transmission and/or the modulation and TBS index table needed in uplink transmission.

In an embodiment, the modulation and TBS index table indication information employed in the downlink transmission may be carried via RRC common signaling. For example, the modulation and TBS index table indication information employed in the downlink transmission is carried by an information element PDSCH-ConfigCommon; wherein, the information element PDSCH-ConfigCommon is contained in broadcast signaling, or is contained in signaling used for reconfiguration of RRC connection, or is contained in signaling used for handover preparation.

In an embodiment, the modulation and TBS index table indication information employed in the uplink transmission may be carried via RRC common signaling. For example, the modulation and TBS index table indication information employed in the uplink transmission is carried by an information element PUSCH-ConfigCommon; wherein, the information element PUSCH-ConfigCommon is contained in broadcast signaling, or is contained in signaling used for reconfiguration of RRC connection, or is contained in signaling used for handover preparation.

In an embodiment, the modulation and TBS index table indication information employed in the downlink transmission may be carried via RRC-specific signaling. For example, the modulation and TBS index table indication information employed in the downlink transmission is carried by an information element PDSCH-ConfigDedicated; wherein, the information element PDSCH-ConfigDedicated is contained in signaling used for initial setup of RRC connection, or is contained in signaling used for reconfiguration of RRC connection, or is contained in signaling used for reestablishment of RRC connection, or is contained in signaling used for handover preparation.

In an embodiment, the modulation and TBS index table indication information employed in the uplink transmission may be carried via RRC-specific signaling. For example, the modulation and TBS index table indication information employed in the uplink transmission is carried by an information element PUSCH-ConfigDedicated-v1020, or is carried by a PUSCH-ConfigDedicatedSCell-r10 information element; wherein, the PUSCH-ConfigDedicated-v1020 information element is contained in signaling used for initial setup of RRC connection, or is contained in signaling used for reconfiguration of RRC connection, or is contained in signaling used for reestablishment of RRC connection, or is contained in signaling used for handover preparation; and the information element PUSCH-ConfigDedicatedSCell-r10 is contained in signaling used for reconfiguration of RRC connection, or is contained in signaling used for handover preparation.

In an embodiment, the modulation and TBS index table indication information employed in the downlink transmission and/or the uplink transmission may be carried via MAC signaling.

The MAC signaling contains only header information, or the MAC signaling contains header information and content information, the header information containing designated LCD, and the content information containing the modulation and TBS index table employed in uplink transmission and/or the modulation and TBS index table employed in downlink transmission.

The eNB of the embodiment of the present disclosure configures the UE with the modulation and TBS index table employed in uplink transmission and/or the modulation and TBS index table employed in downlink transmission via RRC common signaling or RRC-specific signaling or MAC signaling, so that the UE looks up a corresponding table according to the received $I_{MCS}$ to determine the TBS, and performs demodulation and decoding of downlink data or modulation and coding of uplink data according to the determined TBS. Therefore, not only the CQI index and the $I_{MCS}$ bit number need not to be increased, but also normal configuration of the LTE system may be ensured.

An embodiment of the present disclosure further provides UE, as described in Embodiment 8 below. As a principle of the UE for solve problems is similar to that of the method of Embodiment 6, the implementation of the method of Embodiment 6 may be referred to for a particular implementation of the UE, and the repeated parts shall not be described herein any further.

Embodiment 8

Figure 16:
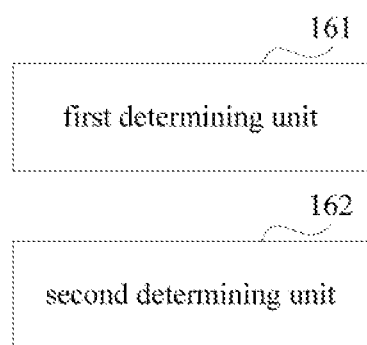
FIG. 16 is a schematic diagram of a structure of UE corresponding to the method of FIG. 13.

An embodiment of the present disclosure provides UE. FIG. 16 is a schematic diagram of a structure of the UE. Referring to FIG. 16, the UE includes:

a first determining unit 161 configured to determine a modulation and TBS index table used for downlink transmission according to received modulation and TBS index table indication information transmitted by an eNB; and a second determining unit 162 configured to determine the MCS configured by the eNB for it according to the modulation and TBS index table used for downlink transmission.

Figure 17:
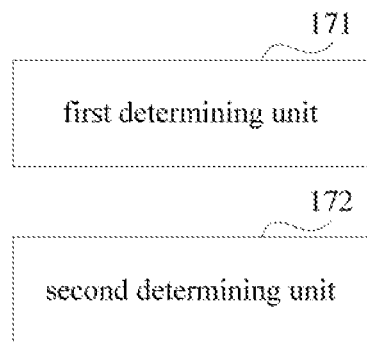
FIG. 17 is a schematic diagram of a structure of UE corresponding to the method of FIG. 14.

An embodiment of the present disclosure provides UE. FIG. 17 is a schematic diagram of a structure of the UE. Referring to FIG. 17, the UE includes:

a first determining unit 171 configured to determine a modulation and TBS index table needed in uplink transmission according to received modulation and TBS index table indication information transmitted by an eNB; and a second determining unit 172 configured to determine the MCS configured by the eNB for it according to the modulation and TBS index table needed in uplink transmission.

In the UE shown in FIGS. 16 and 17, a carrying manner of indication information of the modulation and TBS index table needed in downlink transmission and/or a manner of carrying information of the modulation and TBS index table needed in uplink transmission is identical to that of Embodiment 1 or Embodiment 5, the contents of which being incorporated herein, and being not going to be described herein any further.

An embodiment of the present disclosure provides a communication system, including the UE as described in Embodiment 4 and the eNB as described in Embodiment 3, or including the UE as described in Embodiment 8 and the eNB as described in Embodiment 7.

An embodiment of the present disclosure provides a computer-readable program, wherein when the program is executed in an eNB, the program enables a computer to carry out the method for configuring channel quality indicator (CQI) as described in Embodiment 1, or the method for configuring modulation and coding scheme (MCS) as described in Embodiment 5, in the eNB.

An embodiment of the present disclosure provides a storage medium in which a computer-readable program is stored, wherein the computer-readable program enables a computer to carry out the method for configuring channel quality indicator (CQI) as described in Embodiment 1, or the method for configuring modulation and coding scheme (MCS) as described in Embodiment 5, in an eNB.

An embodiment of the present disclosure provides a computer-readable program, wherein when the program is executed in terminal equipment, the program enables a computer to carry out the method for configuring channel quality indicator (CQI) as described in Embodiment 2, or the method for configuring modulation and coding scheme (MCS) as described in Embodiment 6, in the terminal equipment.

An embodiment of the present disclosure provides a storage medium in which a computer-readable program is stored, wherein the computer-readable program enables a computer to carry out the method for configuring channel quality indicator (CQI) as described in Embodiment 2, or the method for configuring modulation and coding scheme (MCS) as described in Embodiment 6, in terminal equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The logic device may be, for example, a field programmable logic device, a microprocessor, or a processor used in a computer, etc. The present disclosure also relates to a storage medium for storing the above program, such as a hard disk, a floppy disk, a CD, a DVD, and a flash memory, etc.

The present disclosure is described above with reference to particular embodiments.

However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A User Equipment (UE) comprising:
a first Channel Quality Indicator (CQI) index table and a second CQI index table, the first CQI index table including one or more CQI index corresponding to a modulation of higher order that is not supported by the second CQI index table and including CQI indices corresponding to all modulations that are supported by the second CQI index table;
a receiver configured to receive from a base station CQI index table indication information indicating to use the first CQI index table for CQI selection; and
a processor configured to select a CQI index by using the first CQI index table on receiving by the CQI index table indication information and to feed back the selected CQI index to the base station.

2. The UE according to claim 1, wherein the CQI index tables support same number of CQI indices.

3. The UE according to claim 1, wherein CQI indices in the CQI index tables are represented by the same bit length.

4. The UE according to claim 1, wherein the CQI index table indication information is received via Radio Resource Control (RRC) signal.

5. The UE according to claim 1, wherein the higher order of modulation is 256 QAM.

6. The UE according to claim 1, wherein the processor is further configured to select a CQI index by using the second CQI index table unless the receiver receives the CQI index table indication information from the base station and to feed back the selected CQI index to the base station.

7. A method of User Equipment (UE) comprising:
receiving Channel Quality Indicator (CQI) index table indication information from a base station, the CQI index table indication information indicating to use a first CQI index table to use for CQI selection wherein, the first a CQI index table includes one or more CQI index corresponding to a modulation of higher order that is not supported by a second CQI index table and includes CQI indices corresponding to all modulations that are supported by the second CQI index table;
selecting a CQI index by using the first CQI index table on receiving the CQI index table indication information; and
feeding back the selected CQI index to the base station.

8. The method according to claim 7, wherein the CQI index tables support same number of CQI indices.

9. The method according to claim 7, wherein CQI indices in the CQI index tables are represented by the same bit length.

10. The method according to claim 7, wherein the CQI index table indication information is received via Radio Resource Control (RRC) signal.

11. The method according to claim 7, wherein the higher order of modulation is 256 QAM.

12. The method according to claim 7, further comprising selecting a CQI index by using the second CQI index table on not receiving the CQI index table indication information from the base station.

13. A base station communicating with a User Equipment (UE) to configure the UE with a Channel Quality Indicator (CQI) index table, the base station comprising:
a processor arranged to determine a first CQI index table from the first CQI index table and second CQI index table, wherein the first CQI index table includes one or more CQI index corresponding to a modulation of higher order that is not supported by the second CQI index table and including CQI indices corresponding to all modulations that are supported by the second CQI index table, and
to receive CQI index selected and fed back by the User Equipment; and
a transceiver configured to transmit CQI index table indication information to the UE, the Ca index table indication information indicating to use the first CQI index table for CQI selection.

14. The base station according to claim 13, wherein the CQI index tables support same number of CQI indices.

15. The base station according to claim 13, wherein CQI indices in the CQI index tables are represented by the same bit length.

16. The base station according to claim 13, wherein the CQI index table indication information is transmitted via Radio Resource Control (RRC) signal.

17. The base station according to claim 13, wherein the higher order of modulation is 256 QAM.

18. The base station according to claim 13, wherein the transceiver is further configured not to transmit the CQI index table indication information to the UE when the processor determines the second CQI index table from the first CQI index table and the second CQI index table.

19. A method of wireless communication, comprising:
determining a first Channel Quality Indicator (CQI) index table from the first CQI table and a second CQI index table, wherein the first CQI index table includes one or more CQI index corresponding to a modulation of higher order that is not supported by the second CQI index table and including CQI indices corresponding to all modulations that are supported by the second CQI index table;
transmitting CQI index table indication information to a User Equipment (UE), the CQI index table indication information indicating to use the first CQI index table for CQI selection; and
receiving a CQI index selected and fed back by the User Equipment.

20. The base station according to claim 19, wherein the CQI index tables support same number of CQI indices.

* * * * *

UNITED STATES PATENT AND TRADEMARK OFFICE
CERTIFICATE OF CORRECTION

PATENT NO. : 11,258,569 B2
APPLICATION NO. : 16/807821
DATED : February 22, 2022
INVENTOR(S) : Zhang et al.

Page 1 of 1

It is certified that error appears in the above-identified patent and that said Letters Patent is hereby corrected as shown below:

In the Claims

In Claim 1 (Column 37, Line 14) the word "by" should be deleted.

In Claim 13 (Column 38, Line 19) the notation "Ca" should read "CQI".

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*